Patented Feb. 8, 1938

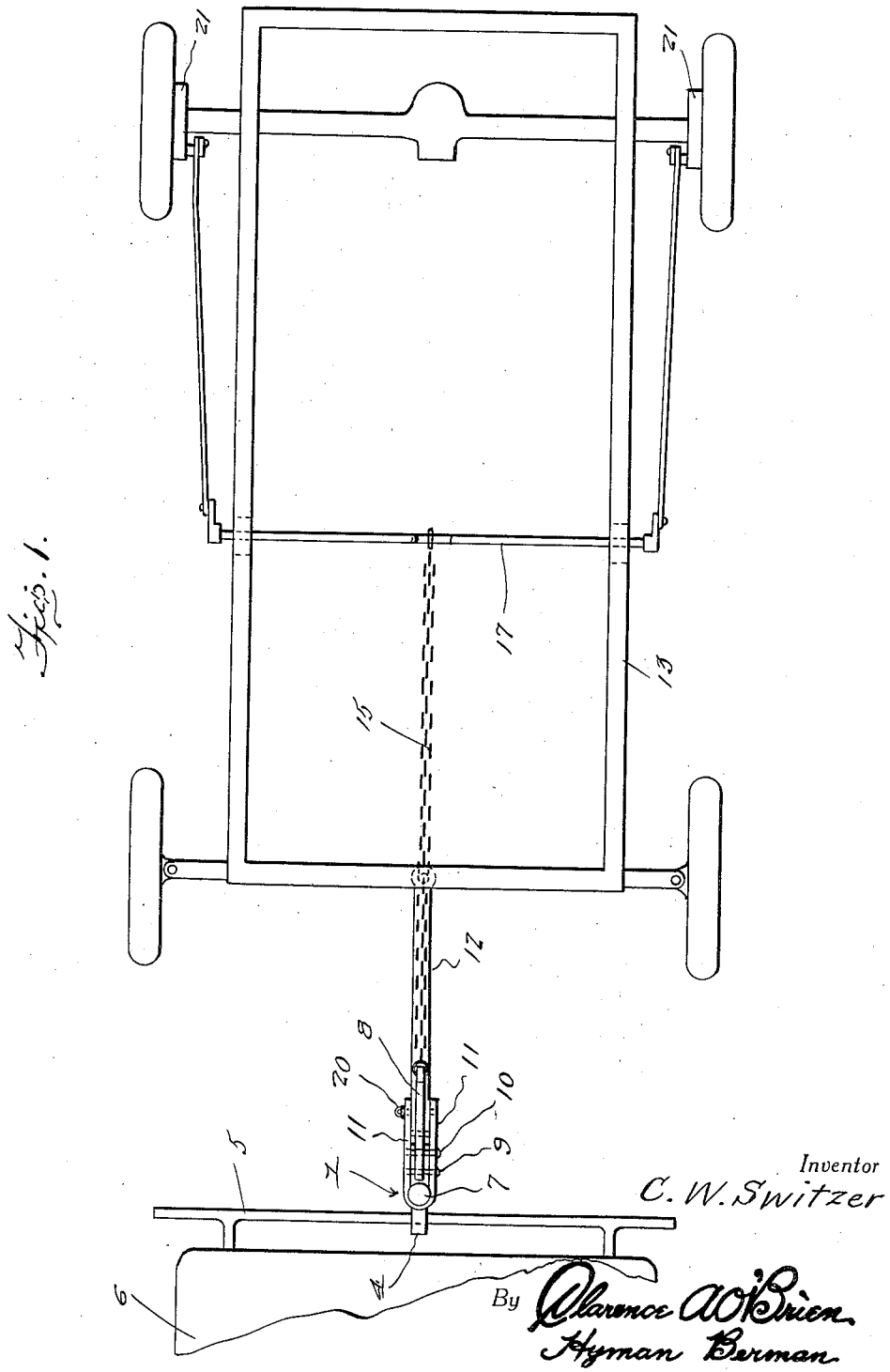

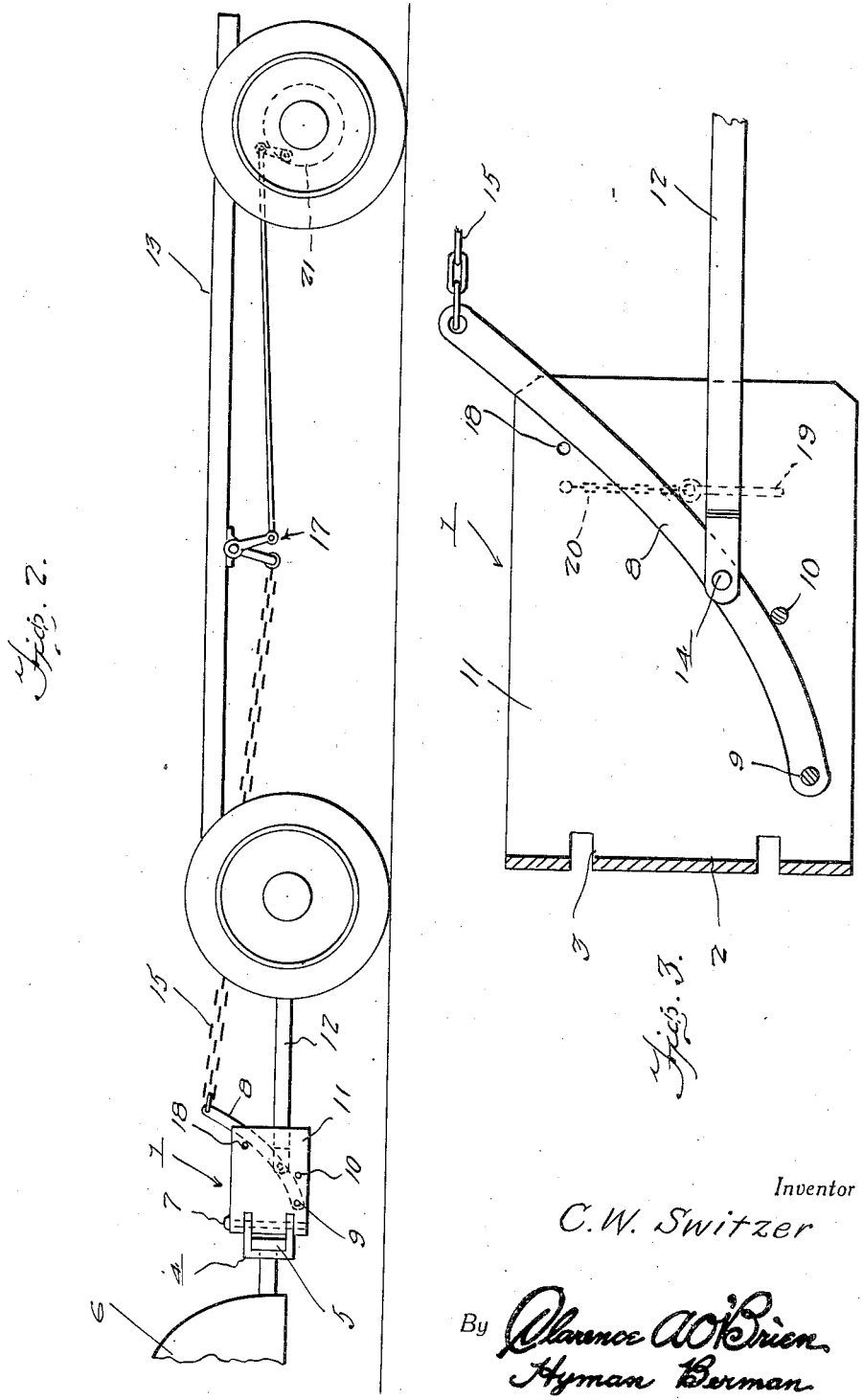

2,107,965

UNITED STATES PATENT OFFICE 2,107,965

TRAILER COUPLING

Clarence W. Switzer, Crawfordsville, Ind.

Application April 13, 1937, Serial No. 136,647

2 Claims. (Cl. 188—142)

The present invention relates to new and useful improvements in trailer couplings and has for its primary object to provide, in a manner as hereinafter set forth, a device of this character embodying a novel construction, combination and arrangement of parts through the medium of which the brakes of the trailer will be automatically applied when the towing vehicle resists forward movement of the trailer, as when going downhill, slowing down or stopping.

Another very important object of the invention is to provide a trailer coupling of the aforementioned character embodying means for rendering the brake applying mechanism inoperative when desired, as when the operator wishes to back the trailer and the towing vehicle.

Other objects of the invention are to provide a trailer coupling of the character described which will be comparatively simple in construction, strong, durable, highly efficient and reliable in use, compact, light in weight and which may be manufactured at low cost.

All of the foregoing and still further objects and advantages of the invention will become apparent from a study of the following specification, taken in connection with the accompanying drawings wherein like characters of reference designate corresponding parts throughout the several views, and wherein:

Figure 1 is a top plan view of an embodiment of the invention.

Figure 2 is a view in side elevation thereof.

Figure 3 is a view in vertical longitudinal section through the device.

Referring now to the drawings in detail, it will be seen that the embodiment of the invention which has been illustrated comprises a substantially U-shaped metallic housing which is designated generally by the reference numeral 1. At vertically spaced points the bight portion 2 of the housing 1 has formed therein circumferential slots 3. The slots 3 are for the reception of the apertured end portions of a clevis 4 through the medium of which the device is detachably connected to the rear bumper bar 5 on an automobile 6. A vertical pin 7 extends through the end portions of the clevis 4 in the bight portion of the housing 1 for anchoring said end portions therein.

The reference numeral 8 designates an arcuate lever which is pivotally connected, at one end, in the lower forward portion of the substantially U-shaped housing 1, as at 9. A stop 10 extends between the side walls 11 of the housing 1 for limiting the rearward and downward swinging movement of the lever 8.

The tongue 12 of a trailer 13 extends into the substantially U-shaped housing 1 through the open rear end thereof and is pivotally connected to the lever at an intermediate point, as at 14. The free end of the lever 8 is connected by a chain 15 to the brake operating mechanism 17 of the trailer 13. The side walls 11 of the housing 1 have formed therein aligned openings 18 for the reception of a pin 19 when it is desired to render the brake applying mechanism inoperative. The pin 19 is connected by a chain 20 to the housing 1 to prevent the loss of said pin.

It is thought that the operation of the invention will be readily apparent from a consideration of the foregoing. When the towing vehicle 6 is pulling the trailer 13, the lever 8 rests against the stop 10, as illustrated to advantage in Fig. 3 of the drawings. However, when the towing vehicle resists forward movement of the trailer 13, as when going down hill or stopping, the tongue 12 swings the lever 8 forwardly on its pivot 9 and the chain 15 actuates the mechanism 17 in a manner to apply the brakes 21 of the trailer 13. Of course, when the towing vehicle 6 begins to pull the trailer against the lever 8 is immediately swung rearwardly until arrested by the stop 10, thus releasing the trailer brakes 21. When it is desired to render the brake operating mechanism inoperative, as when backing, the pin 19 is simply inserted in the openings 18 in the housing 1, thus preventing forward swinging movement of the lever 8. The device may be used on trailers of either the two or four wheel type.

It is thought that the many advantages of a trailer coupling constructed in accordance with the present invention will be readily understood and although a preferred embodiment of the device is as illustrated and described, it is to be understood that changes in the details of construction and in the combination and arrangement of parts may be resorted to which will fall within the scope of the invention as claimed.

What is claimed is:—

1. In a trailer including a tongue, brakes and a mechanism for actuating said brakes, a coupling including a substantially U-shaped housing, the bight portion of said housing having circumferential slots therein, a clevis for connecting the housing to a towing vehicle, the end portions of said clevis projecting into said housing through the slots, a pin mounted in said end portions of the clevis for anchoring said clevis in the housing, a lever pivotally secured, at one end, in the housing, the tongue being pivotally connected to said lever at an intermediate point, and a flexible member operatively connecting the lever to the brake operating mechanism of the trailer for actuating said brake operating mechanism when said lever is moved under the influence of the trailer tongue.

2. In a trailer including a tongue, brakes and an operating mechanism for said brakes, means for connecting the trailer to a towing vehicle including a substantially U-shaped housing having vertically spaced, circumferentially extending slots in its bight portion, a clevis for connecting the housing to the towing vehicle, the end portions of said clevis extending into the housing through the slots, a pin extending through the end portions of the clevis for anchoring said clevis in the housing, a lever pivotally mounted in the housing, a stop for limiting the swinging movement of the lever in one direction, the tongue being pivotally connected to the lever at an intermediate point and adapted to actuate said lever, a flexible member operatively connecting the free end portion of the lever to the brake operating mechanism of the trailer for actuating said brake operating mechanism when the lever is actuated by the trailer tongue, the housing having transversely aligned openings therein, and a pin insertable in said openings for preventing movement of the lever in the opposite direction.

CLARENCE W. SWITZER.